March 7, 1967 H. J. KRESSE ET AL 3,308,006
LAMINATED CORRUGATED PAPER BOARD
Filed Oct. 19, 1961

INVENTORS
TRAVIS L. GORDY
HERMAN J. KRESSE
BY
AGENT

3,308,006
LAMINATED CORRUGATED PAPER BOARD
Herman J. Kresse, Houston, Tex., and Travis L. Gordy, Ponca City, Okla., assignors to Continental Oil Company, Ponca City, Okla., a corporation of Delaware
Filed Oct. 19, 1961, Ser. No. 146,114
4 Claims. (Cl. 161—137)

This invention relates to corrugated paperboard of the general type having a corrugated medium bonded to at least one monoplanar liner.

Corrugated paperboard is widely used in the modern packaging industry for packaging applications where substantial container strength, lightweight and economical construction of the container are the primary requirements. This material is generally constructed by corrugating a flat sheet of relatively strong, inexpensive paper stock, such as that made on a Fourdrinier machine from cooked straw fibers or from virgin kraft pulp, and then bonding one or more monoplanar sheets, termed liners, to the corrugated sheet. The adherence of the liners to the corrugated sheet, termed the medium, is accomplished by applying a suitable adhesive, such as starch or sodium silicate, to the medium at its point of contact with the liner, and then bringing the liners into contact with the medium. The corrugated medium of the paperboard functions, of course, to greatly enhance the strength of the finished paperboard by forming a plurality of firm arches between the liners.

Several types of corrugated paperboard are currently in use for packaging applications. In the so-called "single-face" corrugated board, only a single liner is applied to one face of the corrugated medium. This material is widely used as padding or cushioning, but is not usually employed as a material of construction for shipping containers. For the latter application, a "double-face" corrugated board, having liners bonded to each side of the medium, is usually used. If an unusually high strength container is required, "double-wall" corrugated board may be used. This paperboard comprises a pair of corrugated media having a liner bonded therebetween and having second and third liners adhered to the exposed outer faces of the two media. The latter type of paperboard, due to its relatively great strength, has also been used to construct weight supporting pallets, and has been used, in rolled form, to act as a lightweight column for supporting large masses.

Although corrugated paperboard of the several types mentioned finds many diversified uses in packaging, particularly in the construction of shipping containers, its water absorption and water penetration characteristics have prevented it from replacing more expensive wooden and plastic containers in a number of instances. For example, in the shipment of dressed poultry from processing plants to retailers or wholesalers, the poultry is placed in containers and "iced down" by placing a sufficient quantity of ice on and around the meat to prevent its spoilage en route to its destination. Although some attempts have been made to use corrugated paperboard as the material of construction of the poultry containers, the water produced by the melting ice has soaked into the paperboard so rapidly and has had such a pronounced weakening effect on the containers, that complete collapse of the boxes frequently occurs before the poultry reaches its destination. The media of the corrugated paperboard, in particular, by virtue of their very porous nature, tend to soak up the water and soon offer very little support for the spaced liners which are bonded thereto. As a result of this characteristic of the corrugated paperboard, wooden crates and boxes continue to be the type of container most used in poultry shipments.

The water exposure problem which is characteristic of the poultry shipping containers is also encountered in numerous other situations where the contents of the container have a very high water or moisture content. Packaging of frozen vegetables and fruits, ice cream and other dairy products also presents moisture conditions which preclude or severely limit the use of corrugated paperboard materials for container construction. Moreover, aside from the nature of the contents of the container, shipment and storage conditions frequently subject the containers to high humidity conditions over extended periods of time, or even to exposure to rain or to snow. Under such conditions, even if the container does not weaken to the point of collapse, it is still ineffective to protect the contents of the container from the penetration of moisture through the walls of the container.

In an effort to overcome the susceptibility of paperboard containers to structural weakening and failure upon contact therewith of water or water vapor, it has previously been proposed to coat the medium or liners, or both, with a water-resistant sizing material such as wax or rosin. One of the more recent efforts in this direction has been a process in which the finished paperboard is immersed in a paraffin wax in an effort to thoroughly saturate the paperboard with the wax, which is itself perhaps the most water-repellent of size materials now in use. Although this and other wax-applying processes have, to some extent, extended the service life of corrugated paperboard containers used under adverse moisture conditions, a satisfactory solution to the moisture weakening problem discussed hereinbefore still has not been advanced.

There are several reasons for the failure of the wax-coating process to produce a type of paperboard which will withstand prolonged exposure to water and water vapor without loss of strength and rigidity. Perhaps the most predominant of these is the brittleness of wax. In folding wax-coated blanks into cartons and boxes, the relatively inflexible wax cracks along the fold lines, exposing the substrate, and, at that point, affording no protection from dampness. Further cracking of the wax develops during the rough handling which the container undergoes in packing and shipping. The wax is also easily removed by scuffing and abrasion.

Another reason why the wax has not afforded the hoped-for water-repellent properties is the tendency of the wax to soak into and saturate the stock used in fabricating the paperboard without completely covering the surface thereof. Thus, although the wax sinks into the body of the paperboard material, it does not accumulate in a coating of sufficient thickness at the surface of the substrate to prevent the exposure of some of the fibers of the paper. These exposed fibers, when subjected to contact with water or water vapor, act as wicks conveying the moisture into and through the paper stock of which the medium and the liners are constructed. The susceptibility of the midium to penetration by water and water vapor is particularly great despite the wax-coating procedure, since the medium is a highly porous paper stock containing very long fibers derived from the straw or virgin kraft pulp from which it is constructed. The high porosity of the medium leads to the rapid infiltration and penetration of wax into the body of the medium without leaving a uniform surface coating of sufficient thickness to cover all of the fibers.

It will further be apparent that difficulties are presented in exposing the enclosed medium to a smooth and uniform contact with the wax when the completed paperboard is wax-coated by simply immersing it in molten wax. Some of the areas of the medium may be only very slightly contacted by the wax, or not contacted at all. The same is true to a lesser extent of the liners of the paperboard.

Although coatings with other types of waxes than paraffin wax have been tested, the water-repellency characteristics of such waxes have been little different from that of paraffin wax, and such waxes generally have the disadvantage of being considerably more expensive than paraffin wax which is produced in large quantities as a by-product of the petroleum refining process. Moreover, the brittleness and tendency to crack persists when other types of waxes are employed.

More recently, a slightly different approach to the problem of moisture-proofing has been investigated. By this recent development, it is proposed to coat paper stock utilizing, in general, a blend termed a "hot melt" composition of polyethylene, or other synthetic resins, with wax. Various hot melt mixtures in which wax is the major ingredient have been utilized. However, as a result of these efforts, it has become generally accepted that almost any modification of paraffin wax will result in some lowering of its water vapor transmission characteristic; hence the normal impermeability of the waxed containers to moisture and water vapor is usually reduced when such hot melt blends are employed. Some advantage, however, is generally gained in the resistance of the coating to cracking when subjected to folding and creasing, and also to becoming scratched or scuffed when subjected to abrasive forces. The employment of such hot melts, including that containing polyethylene, is therefore a matter of compromise between the moisture-resistant properties obtainable with straight wax in general usage and the desirable properties of "hot-melt" coatings. The control of properties to be derived from such hot melt blends has been limited to a substantial extent, however, by the degree to which the resinous materials are compatible with the wax. In the case of polyethylene, the compatibility with paraffin wax is limited to relatively low molecular weight polyethylenes which do little toward improving the flexibility of wax.

Broadly stated, the present invention comprises a method of constructing improved corrugated paperboard, which method employs a blend of a wax-extendible copolymer (or mixtures of wax-extendible copolymers) with a wax compatible therewith as a coating for the constituent elements of the paperboard. The methd of the invention presents a solution or many of the problems stemming from water and water vapor susceptibility which have hereinbefore been discussed. In another embodiment, the present invention relates to an improved corrugated paperboard, said paperboard having been prepared by the method hereinbefore described.

In an illustrative embodiment, the process of the present invention can be described more specifically as follows: the medium stock of the paperboard is coated on one or, preferably, both sides with a blend of a wax and a copolymeric material which has good heat-sealing properties and which is compatible with the wax. After the coated corrugated medium is prepared, the coated medium is then passed through corrugating rollers of corrugating equipment as now in use. A preheated single liner is brought into contact with the medium in a conventional manner, the temperature of the liner being sufficient to melt the coating as required to seal the medium to the liner at the points of contact. While the liner is still in contact with the medium, the coating blend is allowed to cool and solidify, thereby bonding the liner to the medium by the adherence of the blend to both elements. A single faced corrugated paperboard of superior properties is thus produced.

Of course, a second liner may be bonded to the second side of the medium in the same manner as that employed in securing the first liner thereto. The double-walled type of corrugated paperboard may also be made by adding a second medium and a third liner to the double-faced board.

We would like to reiterate that the essence of the present invention is in the use of the wax-copolymer blend, of the type described elsewhere herein, to coat the constituent elements of corrugated paperboard, and, especially, to coat the corrugated medium used in corrugated paperboard. In addition to providing a protective coating, the wax-copolymer blends function, also, as an adhesive, thereby bonding together the medium and the attached liner or liners. While the discussion herein describes certain preferred means of applying the wax-copolymer blend to the medium, and of constructing the corrugated paperboard wherein the constituent elements have been coated with the blend, it is to be understood that other methods of accomplishing these objectives fall within the scope of the present invention.

Although corrugated paperboard constructed in the manner described exhibits excellent moisture vapor transmission and durability properties, for some applications, it may be desirable to also treat one or both sides of the liners with either the wax-copolymer blend or with straight wax. Such treatment substantially enhances the water-repellency of the corrugated paperboard as well as its structural strength, but, of course, increases the weight and cost of the paperboard.

Blends of wax and wax-extendible copolymers are satisfactory as coating materials. The preferred compositions, however, constitute blends of paraffin waxes with a copolymer selected from the group consisting of the ethylene-vinyl acetates, the ethylene-ethyl acrylates, and mixtures of ethylene-vinyl acetate and ethylene-ethyl acrylates. Other waxes than paraffin waxes which are compatible with these copolymers may also be employed (or mixtures thereof), but the use of paraffin wax is preferred due to its lower cost. The ethylene-vinyl acetate copolymer is preferred over the ethylene-ethyl acrylate because of the decidedly superior sealing and flexibility properties of coatings of wax blends with this material over those containing the acrylate. However, the acrylate copolymer is less expensive than the ethylene-vinyl acetate and may be the more desirable of the two or may be used as a blend with ethylene-vinyl acetate and wax where certain properties are not critical.

The novel paperboard constructed by the method of the present invention is improved over that made by previous processes in a number of respects. Surprisingly, in view of the performance of various hot melt coatings previously tried, there does not appear to be any loss or decrease in water-repellency, nor any increase in water vapor transmission rate as compared to unfolded, monoplanar paperboard thoroughly saturated and coated with wax. In fact, the degree of penetration of the wax-copolymer blend into the pores of the paper stock appears to be at least as good as the penetration characterizing paraffin waxes, but, in addition, a thin, uniform coating film is distributed over all of the substrate, leaving none of the fibers exposed to undesirably act as wicks in conveying moisture to the interior of the board. Thus, substantial improvement is realized in the resistance of the paperboard to water infiltration over long periods of soaking. Moreover, in some instances, it will be desirable to apply wax initially to the paper stock to penetrate into the pores thereof, and then apply a very thin coating of the copolymer-wax blend to the stock in order to form a thin surface layer thereover.

Perhaps the most striking improvement resulting from the construction of paperboard by the present process is the greatly enhanced general durability of the water-repellent coatings which are applied to the paper stock. These films are tough and flexible so that resistance to cracking or scarring is far superior to films produced by wax or wax blends previously used, when the corrugated paper is folded or crushed or subjected to abrasive forces. The coating adheres tenaciously to the substrate and is considerably harder than the straight wax or wax blends previously used. Because of the resistance of the blend coatings to abrasion and their ability to maintain a continuous, unbroken surface despite severe and repeated flexing of the paperboard, the paperboard constructed in accordance with the invention has much better water resistance after prolonged usage and subjection to extreme conditions than do the wax or hot melt coated paperboards previously constructed.

Other improved characteristics of the blend-coated corrugated paperboard are its good grease resistance and resistance to acidic components found in many types of food products as well as in other materials which might be shipped in containers made from the paperboard; the tenacious bond established between the liners and the medium through the wax-copolymer blend; the relatively low cost of containers made of the paperboard as compared with containers made of wood, metal or synthetic resins; and the variation and control of the properties of coatings applied to the paper stock substrates which may be easily obtained by simply varying the proportion of copolymer to wax in the blend.

The process per se possesses several advantageous aspects apart from a consideration of the superior properties of the product produced thereby. For example, the use of an adhesive material (as opposed to a different water-repellent coating material) for bonding the liners to the medium is eliminated. Moreover, the final wax immersion step is also eliminated.

From the foregoing description, it will be apparent that a major object of the present invention is the manufacture of a corrugated paperboard which may be subjected to high humidity conditions or direct exposure to water over extended periods of time with relatively slight loss in strength, rigidity and dimensional stability resulting therefrom.

An additional object of the present invention is to provide an improved corrugated paperboard manufacturing process which is simpler to perform in that it does not require the use of both a particular adhesive material for the purpose of bonding the medium to the liners and also a waterproofing material.

A further object of the present invention is to provide a corrugated paperboard which is more durable and has a longer effective service life when used as a container for the shipment of materials having a high water content than has been characteristic of corrugated paperboard as previously constructed.

An additional object of the present invention is to provide a method for manufacturing corrugated paperboard in which lighter and less expensive paper stock may be used in order to produce paperboard which retains its strength better after prolonged periods of exposure to water than paperboard made from relatively heavier and more expensive stock.

Other objects and advantages of the present invention will become apparent to the reader as the following detailed description of the invention proceeds, and as the accompanying drawings are studied.

Figure 1:
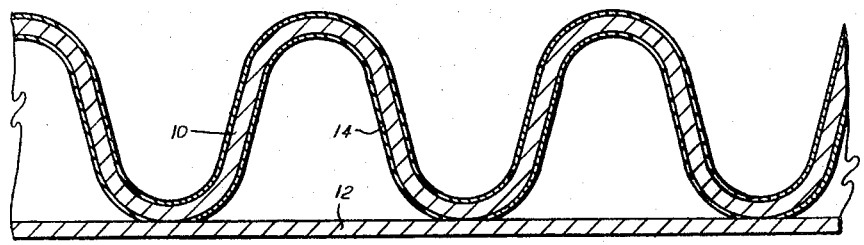
FIGURE 1 is a sectional view taken transversely across the corrugations of a single-faced corrugated board.

Referring now to the drawings in detail, and considering first the drawings collectively, the drawings show each of the three types of corrugated paperboard hereinbefore described and which are commonly in current usage. These paperboards comprise a corrugated central element called the medium and designated in the drawings by reference character 10, and one or more monoplanar liners 12 which are bonded to the medium 10 at the points where the liners contact the corrugations of the medium.

In FIGURE 1, a so-called "single-faced" corrugated board is illustrated. In this type of board, a single liner 12 is bonded to a single corrugated medium 10. This construction provides the least strength and rigidity of the three types shown in the drawings, and is primarily employed as a damping or shock-absorbing material in packing frangible materials.

Figure 2:
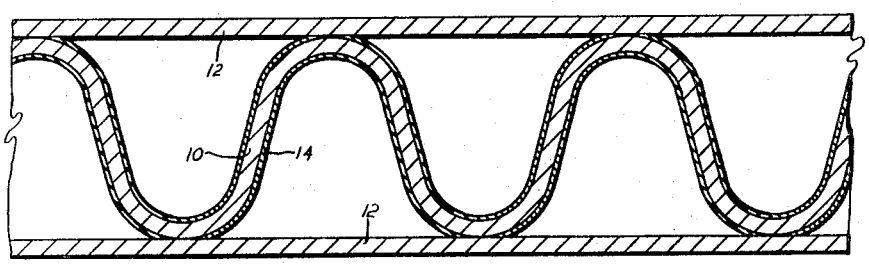
FIGURE 2 is a view similar to FIGURE 1 of a double-faced corrugated board.

In FIGURE 2, the cross-sectional appearance of a sheet of double-faced corrugated paperboard is illustrated. This is the type of paperboard most commonly used in the construction of shipping cartons, crates and the like and is substantially stronger and more rigid than the single-faced board illustrated in FIGURE 1. The double-faced board has a second liner 12 bonded to the opposite side of the central corrugated medium 10 from the side which carries the first liner.

Figure 3:
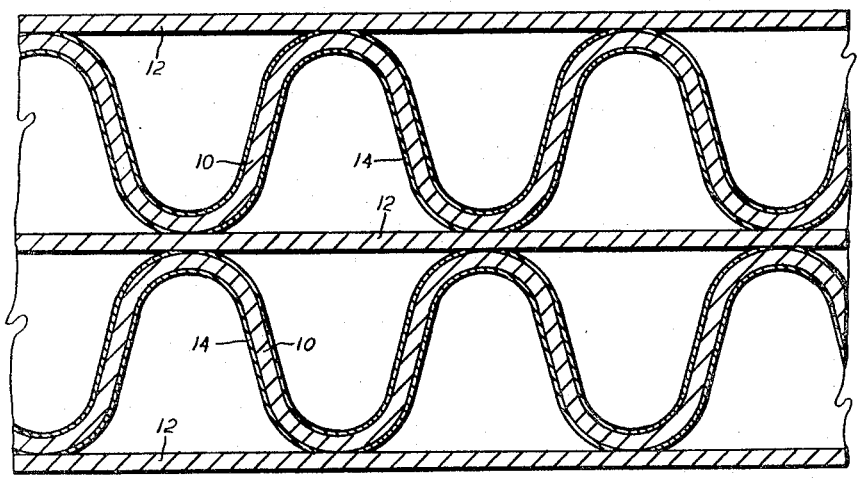
FIGURE 3 is a view similar to FIGURES 1 and 2 of a double-walled corrugated board.

Double-walled corrugated board is illustrated in FIGURE 3. This board is more durable and stronger than the single-faced and double-faced types of board illustrated in FIGURES 1 and 2. It is employed in packaging applications where great strength and durability are required and is also used in the construction of weight-supporting pallets and the like. It will be apparent that the double-walled corrugated paperboard is constructed by adhering a second medium to one of the liners of the ordinary double-faced corrugated paperboard and then securing a third monoplanar liner to the exposed face of this second corugated medium.

Novel corrugated paperboards of any of the three types illustrated and described may be constructed by the process of the present invention. In performing the process of the invention, a blend is initially prepared of a wax-extendible copolymer having a good heat-sealing characteristics with a wax which is compatible with the copolymer. The homogeneous blend is then heated to lower its viscosity to a sufficient extent to permit it to be applied to both sides of the stock material used in manufacturing the corrugated medium 10. Several techniques of coating the stock may be employed, such as hot roll "kiss" coating, gravure coating, or curtain coating. The technique used should allow achieving a uniform film deposition upon the surface of the medium 10 of any desired thickness, preferably not less than one mil thick. The technique should also allow a portion of the blend to penetrate into the pores of the medium 10, thereby imparting even greater moisture resistance to the paperboard than can be achieved by surface coating alone. The relative amounts of the blend inside the sheet and on its surfaces depends on the end result desired, a completely saturated sheet with a surface coating sufficiently thick to cover all paper fibers representing the ultimate in water resistance and strength. After the medium 10 has been coated with the copolymer-wax blend, it is passed through a pair of co-operating corrugating rollers and the coated medium stock is crimped or fluted to the configuration shown in the accompanying drawings. As illustrated in the drawings, the coatings of the wax-copolymer blend which have been applied to both sides of the medium 10 and which are designated by reference character 14 retain their protective properties on both surfaces of the medium 10 after the corrugating operation is completed.

In one typical prior art corrugating process, the corrugating rolls are operated at a high temperature, generally between 350 and 400° F., to effectively set the "wave" in the medium 10. When employing the present invention, such high temperatures cannot be used because the coating 14 would be destroyed. Some heating of the blend is desired. At normal ambient temperatures, the blend has elastic properties that cause it to resist conforming permanently to the shape imposed by the corrugating rolls. The preferred temperature will depend upon the properties of the wax-copolymer blend and the speed of the operation. For example, when using wax-copolymer blends, such as those for which specific data are given in a later discussion, the coating 14 should reach a temperature of between about 100 and 110° F. while in contact with the corrugator rolls. In a typical prior art corrugating operation, glue (or other adhesive) is applied to the tips of the medium 10 corrugations and the first liner 12, which has been heated to 350–400° F., brought in contact with the medium 10 while it is still on a corrugating roll. When employing the present invention, the glue application is eliminated. The first liner 12 is brought into contact with the medium in the conventional manner, said first liner 12 having first been heated sufficiently to melt the coating 14 and effect a proper seal at the points of contact. The required temperature of liner 12 will vary, depending upon the wax-copolymer blend used and the speed of the operation. When using blends, such as those for which specific data are given in a later discussion, a liner 12 temperature between 200 and 250° F. is satisfactory.

As the temperature of the blend coating 14 subsequently decreases, the coating hardens and a firm, tenacious bond is established through the coating between the medium 10 and the liner 12. If the hardening of the coating 14 is allowed to progress by a normal unaccelerated return to ambient temperatures, it is desirable to maintain some pressure upon the liner 12, thereby tending to push this liner against the corrugations of the medium 10 until sufficient time has elapsed for the blend material to set up or harden. On the other hand, cooling or refrigeration may be provided adjacent the point of initial contact of the liner 12 with the coating material 14 in order to accelerate the establishment of the bond between the liner and the medium 10.

Preferred constructions of single-faced, double-faced and double-walled corrugated paperboard have been illustrated in the accompanying drawings and contemplate the application of the wax-copolymer blend only to the opposed surfaces of the corrugated medium 10. However, from the foregoing discussion, it will be readily apparent that certain modified corrugated paperboard constructions in which straight wax or the copolymer-wax blend is applied to one or both sides of the liner 12 are also considered to fall within the scope of the invention. Since, however, the porous medium stock is more susceptible to water penetration and saturation than the more compact, less porous liners, the application of the water-repellent coatings to the corrugated medium is effective to produce a substantial decrease in the rate of water or water vapor transmission through the corrugated paperboard, and is also effective to greatly reinforce the corrugations of the medium, improving their rigidity and resistance to forces applied to the paperboard in use.

The composition and properties of the wax-copolymer blends which can be employed in the present invention are of considerable importance. First of all, it is necessary that the wax and copolymer be compatible with each other in all proportions used. A wide variety of waxes are suitable for use in our invention. Microcrystalline wax and paraffin wax are particularly suitable. In addition, it is possible that some of the natural waxes can be employed. The paraffin waxes are preferred because of their general availability and low price. With regard to the copolymer, as previously mentioned, it is necessary that it be compatible with the paraffin wax in the proportions used. In addition, it is preferable that the copolymer have good heat-sealing properties and provide a tough film. It is possible to use a copolymer having marginal heat-sealing properties, such marginal heat-sealing properties being overcome by he use of an additive or agent, commonly used in "hot-melt" coatings, which gives good sealing properties. Examples of such agents include butyl rubber, polyisobutylene, polyethylene, "ethyl Cellosolve," cyclized rubber, and butadiene-styrene copolymers. While the term "paraffin wax" is believed to be well understood in the art, it may be well, in order to avoid ambiguity, to define it. The term "paraffin wax," as regards the present application, refers to a material meeting the following requirements: (1) derived from petroleum, (2) normally a solid at room temperature, and (3) consisting of hydrocarbons, which are predominantly straight-chain. While the preferred paraffin wax is the grade known to the trade as "fully-refined," a "semi-refined" parafin wax is satisfactory.

Particularly suitable copolymers are the following ethylene-vinyl acetate copolymer, ethylene-ethyl acrylate copolymer, and mixtures thereof. Of these, the ethylene-vinyl acetate copolymer is preferred, since it gives better sealing and flexibility results.

The ethylene-vinyl acetate copolymers and the ethylene-ethyl acrylate are prepared by free radical polymerization of the co-monomers at elevated temperatures and pressures. The copolymers are usually identified by a combination of the ratios of the comonomers present in the product and by the melt index. Suitable ethylene-vinyl acetate copolymers for use in the present invention are those containing from about 60 to about 80 percent (weight) ethylene and from about 20 to about 40 percent (weight) vinyl acetate and having melt indexes in the range of about 5 to about 50. Particularly suitable ethylene-vinyl acetate copolymers are those containing from about 66 to about 73 percent (weight) ethylene and from about 27 to about 34 percent (weight) vinyl acetate and having melt indexes in the range of about 12 to about 28. Preferred ethylene-vinyl acetate copolymers are those containing from about 71 to about 73 percent (weight) ethylene and from about 27 to about 29 percent (weight) vinyl acetate and having melt indexes in the range of about 12 to about 18. Suitable ethylene-ethyl acrylate copolymers are those containing from about 65 to about 85 percent (weight) ethylene and from about 15 to about 35 percent (weight) ethyl acrylate and having melt indexes in the range of about 3 to about 20.

Ethylene-vinyl acetate copolymers are available in commercial quantities from the Du Pont Company and are sold under the "Elvax" trademark. Properties of various "Elvax" copolymers are as follows:

| Property | "Elvax" 250 | "Elvax" 240 | "Elvax" 150 |
| --- | --- | --- | --- |
| Co-monomer Ratios: | | | |
| Percent Ethylene | 73 to 71 | 73 to 71 | 68 to 66 |
| Percent Vinyl Acetate | 27 to 29 | 27 to 29 | 32 to 34 |
| Melt Index [1] | 12 to 18 | 22 to 28 | 22 to 28 |
| Density at 30° C | .95 | | .95 |
| Refractive Index, 25° C., D Line | 1.482 | | 1.485 |
| Softening Point, Ring and Ball, ° F | 276 | | 243 |

[1] The melt index is determined by ASTM Method No. D 1238–57T.

A suitable wax-copolymer blend of the present invention contains from about 25 percent to about 60 percent (by weight) of the copolymer, with the remainder comprising wax. A preferred wax-copolymer blend contains from about 30 to about 45 percent (by weight) of the copolymer, with the remainder comprising wax. If necessary, the wax-copolymer blend may contain a small amount of commonly used wax additives, as for example, an antioxidant.

While several methods may be used for preparing the wax-copolymer blend, a satisfactory method is as follows: About one-half of the required amount of wax is heated to a temperature of between 250° F. and 300° F. in a high-shear mixer. All of the required copolymer is then blended into the hot wax to form a copolymer-wax concentrate in which no discrete particles of the copolymer can be discerned. The balance (or other one-half) of the wax is next added, and the total mixture blended to a uniform consistency. The blend is then ready for use in the process of our invention.

We have conducted laboratory tests to determine the improvement in structural strength which may be expected to result from the employment of the process principles of the present invention. In order to have a "standard" for purposes of comparison, a sample of corrugated paperboard was made in the laboratory using a water-resistant glue. The same type of paper stock was then used to prepare, in the laboratory, samples of corrugated paperboard according to the method of our invention. In all cases, using our method, the medium was coated with the wax-copolymer blend. In some cases, the liner was coated on one side with the blend, while in other cases the liner was coated on both sides with the blend. In no case was an adhesive used in addition to the wax-copolymer blend. Comparative tests of the bending strengths and compression strengths, both before and after water soaking, of wax-treated, blend-treated and untreated double-faced corrugated paperboard samples were made, and the data obtained from these tests are set forth in the following table. Since laboratory methods of constructing the paperboard samples necessarily differed to some extent from those employed commercially in producing the board, the strength data are tabulated in terms of percent improvement of the wax-treated and polymer-treated boards relative to these same properties as displayed by untreated board. In the case of the wax-coated samples tested, the wax was applied by the dipping technique hereinbefore described. The blend-coated samples were, in each case, characterized in having a blend-coated medium prepared by applying the blend to both sides of the medium prior to bonding the liners thereto.

The bending strength test was conducted by supporting a strip of corrugated paperboard (1" x 4") at two points, 2" apart, and applying a force from the side opposite. In the compression strength test, a metal disc (1¾" in diameter) was forced against a side of the corrugated paperboard which in turn was lying on a rigid metal block. An Instron Tensile Testing Machine was used to both apply and record the forces in both tests.

Wax A and Wax B samples, "Penetration—No Surface Coat."

The data further indicate that, in general, the strength of the paperboard is improved by coating both sides of the liners instead of only the inner side thereof, and also that blends composed of higher percentages of the copolymer give better strength properties than the predominantly wax blends.

An interesting result is also to be noted in the compression strength data obtained for sample 2–b, which had only the inner side of the liners coated with a surface coating of a blend of 50% copolymer and 50% wax. After soaking this sample for twenty-four hours, it still demonstrated a compression strength of well over twice the value of the compression strength observed for the sample coated with Wax B, and about six times the compression strength of the sample coated with Wax A, even though the latter samples had been soaked for only twelve hours.

In addition to the compression strength and bending strength tests which were run on the samples identified in the table, each of these samples was also tested to determine the strength of the bond established between the medium and the liners. In the case of the wax-coated samples, the liners were bonded to the medium using a water-resistant adhesive commonly used in fabricating paper milk containers.

In all cases, both before and after water soaking, the bond between the adhesive and the paper was stronger

| Coating Formulation | Liner Coating | Bending Strength, Percent Increase Over Unwaxed Board | | Compression Strength, Percent Increase Over Unwaxed Board | |
|---|---|---|---|---|---|
| | | Not Water Soaked | Water Soaked 14 Hours | Not Water Soaked | Water Soaked 14 Hours |
| Wax A (Representing Commercial Practice) | Penetration; No Surface Coat | 100 | 400 | 100 | 140 |
| Wax B (Representing Commercial Practice) | do | 150 | 700 | 165 | 320 |
| 1. Coatings applied to give penetration and surface coat: | | | | | |
| a. 30% Copolymer C, 70% Wax A | Inner Side Only | 47 | 700 | 100 | 1,300 |
| b. 30% Copolymer C, 70% Wax A | Both Sides | 87 | 1,800 | 158 | 830 |
| c. 50% Copolymer C, 50% Wax A | do | 227 | 7,000 | 474 | 4,900 |
| 2. Coatings applied to surface only: | | | | | |
| a. 30% Copolymer C, 70% Wax A | Inner Side Only | 47 | 500 | 104 | 1,180 |
| b. 50% Copolymer C, 50% Wax A | do | 53 | 900 | 106 | *825 |
| c. 30% Copolymer C, 70% Wax A | Both Sides | 100 | 1,400 | 140 | 1,050 |
| d. 50% Copolymer C, 50% Wax A | do | 133 | 1,800 | 120 | 825 |

Wax A: Refined petroleum wax, 122–126° F., A.S.T.M. melting point; 0.25% oil, maximum.
Wax B: Refined petroleum wax, 143–150° F., A.S.T.M. melting point; 0.25% oil, maximum.
Copolymer C: Ethylene-vinyl acetate with a co-monomer ratio of 71:29, respectively; melt index 15.
*24-hour Water Soaked Sample.

It will be noted from the tabulated data that a very marked improvement in bending strength and compression strength results when ordinarily used commercial coating waxes are blended with an ethylene-vinyl acetate copolymer. The improvement is even more remarkable when it is appreciated that the blends employed in the tests utilized the wax, Wax A, which, in itself, demonstrated poorer strength properties than the second wax tested, Wax B. Even greater improvement can therefore be reasonably anticipated when blends of Wax B with the copolymer are employed.

In order to investigate the effect of penetration of the blend into the pores of the paper stock substrate, samples 1–a, 1–b and 1–c were placed in an oven and heated for a short period of time to liquefy the blend sufficiently to promote penetration. A comparison of the data obtained for these samples with data obtained for samples 2–a, 2–b, 2–c and 2–d indicates that an improvement in strength is generally effected by promoting the penetration of the blend into the substrate. Comparable evaluations for the pure wax applications were not obtained since, as has been indicated, the wax, as now applied commercially penetrates into the pores of the stock material and does not form a uniform surface coating. Hence, the designation has been used in column 2 of the table opposite the than the bond between the paper fibers. This is referred to in the trade as a fiber tear seal. These results demonstrate the sealing ability of the coating blend as fully meeting the requirement for bonding the medium to the liners. Of course, the advantages of using the coating blend as the adhesive is the elimination of a separate adhesive and the protection of the paper from attack by moisture, thus preserving the paper fiber to fiber bond.

From the foregoing discussion, it will be apparent that a substantial improvement in the bending and compression strength of corrugated paperboard is achieved by the fabricating process of the present invention. This is especially true of these parameters after the board has been subjected to contact with water over prolonged periods of time. Other properties, most importantly, water permeability and water vapor transmission rate, are also improved with respect to other types of hot melt compositions previously utilized to coat various paper stocks.

Although but a limited number of embodiments of the present invention have been set forth in the foregoing specification for purposes of description, it will be apparent that certain innovations and modifications in the steps of the process described and the materials utilized in the process may be employed without departure from the principles of the invention herein disclosed. Insofar as such innovations and modifications continue to rely upon the principle or principles hereinbefore described, and underlying the present invention, they are considered to be embraced within the scope and spirit of the invention as defined by the following claims.

We claim:

1. A corrugated paperboard comprising at least one corrugated medium, said corrugated medium being coated with a wax-copolymer blend, and at least one monoplanar liner, said corrugated paperboard being characterized further in that said monoplanar liner is bonded to said corrugated medium through said wax-copolymer blend, said wax-copolymer blend comprising a wax containing from about 25 to about 60 weight percent ethylene-ethyl acrylate copolymer and being characterized further in that the wax is selected from the group consisting of paraffin wax, microcrystalline wax and mixtures thereof.

2. A corrugated paperboard as described in claim 1 wherein said ethylene-ethyl acrylate copolymer is characterized as containing from about 65 to 85 weight percent ethylene and from about 15 to about 35 weight percent ethyl acrylate and as having melt indexes in the range of about 3 to about 20.

3. A corrugated paperboard comprising at least one corrugated medium and at least one monoplanar liner, said corrugated paperboard being further characterized in that said corrugated medium and said monoplanar liner are coated with a wax-copolymer blend, and that said corrugated medium is bonded to said monoplanar liner through said wax-copolymer blend, said wax-copolymer blend comprising a wax containing from about 25 to about 60 weight percent ethylene-ethyl acrylate copolymer and being characterized further in that the wax is selected from the group consisting of paraffin wax, microcrystalline wax and mixtures thereof.

4. A corrugated paperboard as described in claim 3 wherein said ethylene-ethyl acrylate copolymer is characterized as containing from about 65 to about 85 weight percent ethylene and from about 15 to about 35 weight percent ethyl acrylate and as having melt indexes in the range of about 3 to about 20.

References Cited by the Applicant
UNITED STATES PATENTS

| | | | |
|---|---|---|---|
| 2,232,595 | 2/1941 | Dittmar | 260—28.5 |
| 2,490,550 | 12/1949 | Sermattei | 260—28.5 |
| 2,877,196 | 3/1959 | Reding | 260—28.5 |
| 3,025,167 | 3/1962 | Butler. | |
| 3,077,222 | 2/1963 | Shanley | 156—473 |

EARL M. BERGERT, *Primary Examiner.*

J. J. BURNS, C. B. COSBY, *Assistant Examiners.*

UNITED STATES PATENT OFFICE
CERTIFICATE OF CORRECTION

Patent No. 3,308,006                                               March 7, 1967

Herman J. Kresse et al.

It is hereby certified that error appears in the above numbered patent requiring correction and that the said Letters Patent should read as corrected below.

Column 2, line 56, for "midium" read -- medium --; column 3, line 43, for "methd" read -- method --; line 44, for "or" read -- for --; column 6, line 23, for "corugated" read -- corrugated --; column 9, line 69, for "in" read -- is --; column 11, line 20, for "about 65 to 85" read -- about 65 to about 85 --.

Signed and sealed this 7th day of November 1967.

(SEAL)
Attest:

Edward M. Fletcher, Jr.                                         EDWARD J. BRENNER Attesting Officer                                                       Commissioner of Patents